2,997,636
MOTOR CONTROL SYSTEMS
Eric Pell, Wauwatosa, Wis., assignor to Cutler-Hammer, Inc., Milwaukee, Wis., a corporation of Delaware
Filed Sept. 8, 1958, Ser. No. 759,489
7 Claims. (Cl. 318—30)

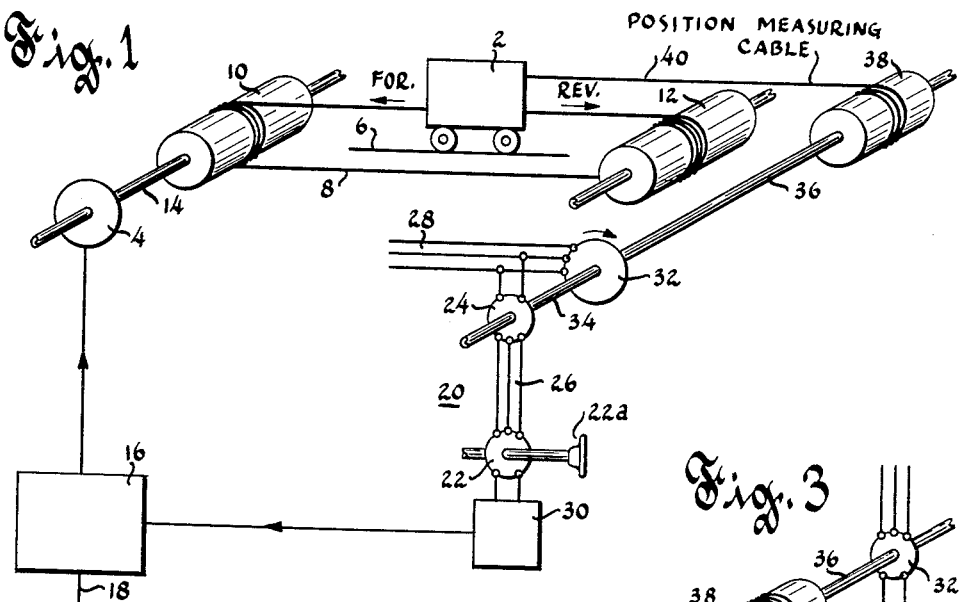
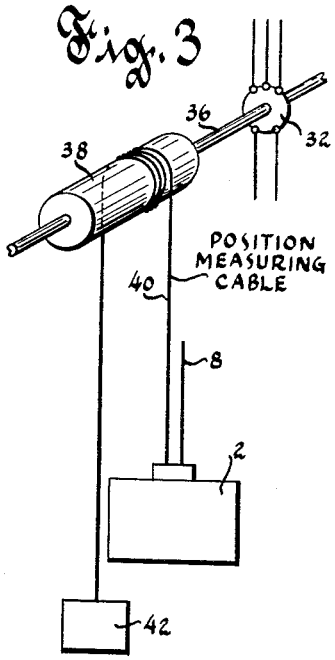
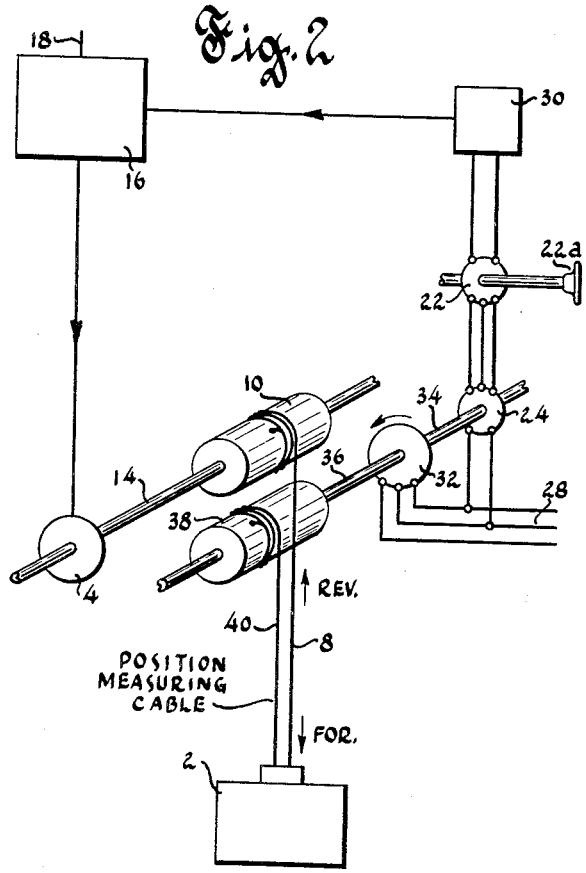

This invention relates to motor control systems and more particularly to follow-up systems of the synchrotie type or the like.

In position control systems, the follow-up position signal is often, for mechanical or other reasons, derived from the position of the drive motor or some intermediate gear rather than that of the load or actual portion of the drive being controlled. Positioning accuracy is thus adversely affected by the elasticity or stretch in the drive cable and the backlash of the drive mechanism.

While not limited thereto, the invention is especially applicable to systems for positioning a load which systems have an elastic connection and backlash between the driving means and the load.

A general object of the invention is to provide improved means for accurately positioning a load.

A more specific object of the invention is to provide a follow-up system with improved means for accurately measuring and controlling the position of the load in a drive having an elastic or strainable driving link.

Another specific object of the invention is to provide a synchrotie system adapted for remotely positioning a load with improved means for preventing "give" in the driving connection or backlash in the drive gearing from causing inaccuracy in preselected positioning of the load.

Other objects and advantages of the invention will hereinafter appear.

While the apparatus hereinafter described is effectively adapted to fulfill the objects stated, it is to be understood that I do not intend to confine my invention to the particular preferred embodiments of positioning control systems disclosed, inasmuch as they are susceptible of various modifications without departing from the scope of the appended claims.

The invention will now be described in detail with reference to the accompanying drawings wherein:

FIGURE 1 is a schematic diagram of a positioning control system incorporating the invention;

FIG. 2 is a schematic diagram of a modified positioning control system; and

FIG. 3 is a fragmentary schematic diagram of a modification of the system of FIG. 2.

Referring to FIG. 1, there is shown a system for positioning a load 2 such as a cable car or the like. Load 2 is arranged to be driven in reverse directions by a reversible electric drive motor 4. To this end, load 2 is arranged to travel on a track 6 and is connected at its ends to the ends of a flexible drive cable 8. Intermediate portions of drive cable 8 are wound around a driving drum 10 and a driven drum 12, the drums being spaced apart on either side of the load to provide for travel of the load in opposite directions. Drive motor 4 is connected through a suitable shaft 14 and gearing (not shown) for rotating driving drum 10. A motor control system 16 supplied from a suitable power supply source 18 is provided for forward and reverse running control of motor 4.

Motor control system 16 is arranged to be controlled from a follow-up system of the synchrotie type indicated generally at 20. Synchrotie system 20 is provided with a pair of electric machines including a position setter and receiver 22 and a transmitter 24, position setter and receiver 22 being provided with a setting wheel 22a. Receiver 22 and transmitter 24 are provided with single-phase rotor windings and three-phase stator windings, the stator windings thereof being connected together through conductors 26. The rotor windings of transmitter 24 are excited from a single phase of a three-phase source 28. The rotor windings of receiver 22 are connected through a suitable demodulator 30 to motor control system 16.

Three-phase power supply source 28 is connected for energizing a torque motor 32. The rotor of torque motor 32 is connected through a driving shaft 34 to the rotor of transmitter 24 and through a shaft 36 to a measuring cable drum 38. A position measuring cable 40 has one of its ends connected to load 2 and its other end wound around and secured to drum 38. Measuring cable 40 may be constructed of any suitable material which is not materially subject to strain or stretch under operating conditions and may be compensated for thermal expansion if desired.

The operation of the system of FIG. 1 will now be described. Let it be assumed that it is desired to move load 2 to a given position in the forward or left-hand direction as indicated by the arrow adjacent cable 8. Setting wheel 22a on receiver 22 is rotated to the selected position as indicated by a suitable dial thereon to position the receiver. As a result, a signal is transmitted from receiver 22 through demodulator 30 to operate motor control system 16 thereby to initiate operation of drive motor 4 in the forward direction. Drive motor 4 in turn takes up backlash in the gearing and rotates drum 10 to drive load 2 through cable 8. As the load moves in the forward direction, measuring cable 40 rotates drum 38 in the counter clockwise direction against the clockwise torque of motor 32. Drum 38 drives transmitter 24 until the latter matches the preset position of receiver 22 whereupon motor 4 stops.

An essential feature of the invention is the provision of a separate cable 40 for driving transmitter 24 accurately in accordance with the movement of the load. Thus, the load is accurately positioned even if backlash is present and if driving cable 8 should stretch under operating conditions.

When setting wheel 22a is set to move the load in the reverse or right-hand direction, torque motor 32 rotates transmitter 24 as well as drum 38 to rewind the measuring cable.

The modified positioning control system shown in FIG. 2 is similar to that shown in FIG. 1, and like reference characters are employed therein for like elements, except that the control is applied to a hoist. Thus, a hoist cable 8 is wound around driving drum 10 and connected at its free end to a free hanging load 2. Measuring cable 40 has one end connected to the load and its other end wound around and secured to drum 38. When the receiver is adjusted to lower the load, measuring cable 40 rotates drum 38 and transmitter 32 in the clockwise direction against the torque of motor 32. When the load is raised, torque motor 32 rotates transmitter 24 and rewinds cable 40 on drum 38. As will be apparent, stretch in hoist cable 8 will not cause an error in the position of the load.

The system of FIG. 2 may be modified as shown in FIG. 3 by substituting a counter weight 42 for torque motor 32. As will be apparent, when load 2 is lowered, drum 38 rotates in the clockwise direction to raise the counter weight and, when load 2 is raised, the counter weight rotates drum 38 in the counter clockwise direction to drive transmitter 32 and to maintain cable 40 taut.

I claim:

1. In a follow-up system for accurately positioning a movable load, a driving motor, means comprising an elastic link for drivingly connecting said motor to the load, settable means for selecting the position of the load, means responsive to setting of said settable means for controlling operation of the motor, follow-up means, and means comprising a mechanical measuring device connected directly to the load for operating said follow-up means in response to the actual movement of the load, said motor control means responding to stop said driving motor when the load reaches its selected position.

2. The invention defined in claim 1, wherein said means comprising a measuring device includes a measuring cable and a drum, one end of said cable being connected to the load and the other end thereof being wound around said drum to rotate the latter when the load is moved, and said drum being drivingly connected to said follow-up means.

3. The invention defined in claim 2, together with means for biasing said drum and said follow-up means in one direction of rotation, said measuring cable driving said drum and said follow-up means against the force of said bias when the load is moved in one direction and said biasing means driving said follow-up means and said drum when the load is moved in the other direction.

4. The invention defined in claim 3, wherein said biasing means comprises a torque motor.

5. The invention defined in claim 3, wherein said biasing means comprises a counter weight connected to the other end of said measuring cable.

6. In a follow-up system for accurately positioning a load of the type having a flexible cable connection for moving the load, settable means for selecting a position for the load, and follow-up means responsive to setting of said means for automatically moving the load to the selected position, the improvement including means for preventing stretch in the flexible driving cable from causing an error in the positioning of the load, said means comprising a separate measuring cable connected to the load for operating said follow-up means in accordance with the actual movement of the load.

7. In a synchrotie system for positioning a load, said system comprising a driving motor, a flexible cable for drivingly connecting said motor to the load to move the latter, and synchrotie means having an electrically connected settable device and a follow-up device for controlling operation of said motor, the improvement comprising a separate measuring cable having one end connected to the load, a drum connected for rotation in unison with said follow-up device, the other end of said measuring cable being wound around said drum for driving the latter when the load moves in one direction, and torque producing means connected to said drum for driving the latter and said follow-up device when the load moves in the other direction.

References Cited in the file of this patent

UNITED STATES PATENTS

| 2,537,083 | Peoples | Jan. 9, 1951 |
| 2,871,431 | Brook | Jan. 27, 1959 |
| 2,889,508 | McCoy et al. | June 2, 1959 |

FOREIGN PATENTS

| 591,131 | Great Britain | July 11, 1938 |